US010500951B2

(12) United States Patent
Pydin

(10) Patent No.: US 10,500,951 B2
(45) Date of Patent: Dec. 10, 2019

(54) VEHICLE

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/344,933

(22) PCT Filed: Oct. 25, 2017

(86) PCT No.: PCT/JP2017/038539
§ 371 (c)(1),
(2) Date: Apr. 25, 2019

(87) PCT Pub. No.: WO2018/079615
PCT Pub. Date: May 3, 2018

(65) Prior Publication Data
US 2019/0270379 A1    Sep. 5, 2019

(30) Foreign Application Priority Data
Oct. 28, 2016    (JP) .................................. 2016-212291

(51) Int. Cl.
*B60K 1/00*       (2006.01)
*B60K 17/16*      (2006.01)
(Continued)

(52) U.S. Cl.
CPC .............. *B60K 17/165* (2013.01); *B60K 1/00* (2013.01); *B60K 6/26* (2013.01); *B60K 6/36* (2013.01);
(Continued)

(58) Field of Classification Search
CPC .......... B60K 17/165; B60K 1/00; B60K 6/26; B60K 6/36; B60K 6/40; B60K 17/12;
(Continued)

(56) References Cited

U.S. PATENT DOCUMENTS

2003/0066694 A1*  4/2003  Mita ........................ B60K 1/00
                                                            180/65.1
2014/0116201 A1*  5/2014  Spiegel ..................... B60K 1/00
                                                            74/661

FOREIGN PATENT DOCUMENTS

CN    201951243 U    8/2011
JP    11-180172 A    7/1999
(Continued)

OTHER PUBLICATIONS

International Search Report and Written Opinion dated Dec. 26, 2017 corresponding to International Patent Application No. PCT/JP2017/038539, and partial English translation thereof.

*Primary Examiner* — John D Walters
*Assistant Examiner* — James J Triggs
(74) *Attorney, Agent, or Firm* — Squire Patton Boggs (US) LLP

(57) ABSTRACT

Provided is a vehicle in which an electric motor is disposed such that a rotational axis of a rotor of the electric motor is located to one side, from the center of the front-back direction, relative to: a second power transmission member that is disposed on a power transmission path between a first rotating element and one wheel LWf; a third power transmission member that is arranged on a power transmission path between a third rotating element and the other wheel; or a differential mechanism.

6 Claims, 15 Drawing Sheets

(51) Int. Cl.
*B60K 6/26* (2007.10)
*B60K 6/36* (2007.10)
*B60K 6/40* (2007.10)

(52) U.S. Cl.
CPC ............. *B60K 6/40* (2013.01); *B60Y 2200/91* (2013.01); *B60Y 2200/92* (2013.01); *B60Y 2400/80* (2013.01)

(58) Field of Classification Search
CPC .... B60K 17/16; B60K 17/30; B60Y 2200/91; B60Y 2400/80; B60Y 2200/92
See application file for complete search history.

(56) References Cited

FOREIGN PATENT DOCUMENTS

| | | |
|---|---|---|
| JP | 2012-029369 A | 2/2012 |
| JP | 2013-014302 A | 1/2013 |
| JP | 2013-159286 A | 8/2013 |
| JP | 2014-084102 A | 5/2014 |

* cited by examiner

VEHICLE

TECHNICAL FIELD

The present invention relates to a vehicle.

BACKGROUND ART

Conventionally, an electric vehicle which is a vehicle in which the wheels are driven by a motor (electric motor) has been known (for example, refer to Patent Document 1). The motor is arranged in a positional relationship whereby the extending direction of the output shaft of the motor driving the right and left wheels of the vehicle matches the vehicle width direction which is the horizontal direction.

Patent Document 1: Japanese Unexamined Patent Application, Publication No. H11-180172

DISCLOSURE OF THE INVENTION

Problems to be Solved by the Invention

In the case of the motor being arranged in a positional relationship in which the extending direction of the output shaft of the motor is a horizontal direction and matches the vehicle width direction, the position at which the output shaft of the motor is arranged is higher as the diameter of the motor increases, and the motor becomes larger in the vertical direction. For this reason, it has been difficult to achieve lowering of the center of gravity of a vehicle having a motor. In addition, it has been difficult to secure large capacity on the upper side of the front compartment. In addition, even if the diameter of the motor becomes larger, an increase in the crash stroke is demanded; however, in the case of the extending direction of the output shaft of the motor being the horizontal direction, and the motor being arranged in a positional relationship matching the vehicle width direction, it has been difficult to increase the crash stroke, and it has been difficult to improve the protection of the passenger space.

The present invention has been made taking account of the above, and an object thereof is to provide a vehicle which is capable of achieving lowering of the center of gravity of a vehicle having an electric motor, capable of ensuring large capacity at the upper side of the front compartment, and capable of achieving an increase in crash stroke and protection of the passenger space.

Means for Solving the Problems

In order to achieve the above-mentioned objects, the present invention provides a vehicle (for example, the vehicle 3, 3A, 3B, 3C, 3D, 3E, 3F described later) including: an electric motor (for example, the electric motor 300 described later) which drives a left wheel (for example, the left-front wheel LWf described later) and a right wheel (for example, the right-front wheel RWf described later) of the vehicle, and has a rotor (for example, the rotor 301 described later) and a stator (for example, the stator 302 described later); and a differential mechanism (for example, the differential mechanism 400 described later) which has three rotating elements, and configured so that rotation speeds of the three rotating elements satisfy a collinear relationship on a single line in a collinear figure; in which the differential mechanism is disposed on a power transmission path between the electric motor and the left wheel and the right wheel; when defining the three rotating elements as a first rotating element (for example, the left-side gear 402 described later), a second rotating element (for example, the differential case 403 described later) and a third rotating element (for example, the right-side gear 404 described later) in arrangement order of the collinear figure, the first rotating element is mechanically connected to one wheel (for example, the left-front wheel LWf described later), which is either one among the left wheel and the right wheel, the second rotating element is mechanically connected to the electric motor, the third rotating element is mechanically connected to the other wheel (for example, the right-front wheel RWf described later) which is the other one among the left wheel and the right wheel; in which the left wheel and the right wheel are disposed biasing to one side (for example, the forward side of the vehicle 3 described later) relative to a center in a front/rear direction of the vehicle; in which the electric motor is disposed so that the rotation axis of the rotor extends along a vertical direction of the vehicle, and is disposed so that the rotor is located lower than a first power transmission member (for example, the bevel gear 304, intermediate shaft 321, differential ring 401 described later) disposed on a power transmission path between the electric motor and the differential mechanism, and further is arranged so that the rotation axis of the rotor of the electric motor is disposed so as to be located more to the one side relative to the front/rear direction center in relation to: a second power transmission member (for example, the left-front drive shaft 501 described later) disposed on the power transmission path between the first rotating element and the one wheel, a third power transmission member (for example, the right-front drive shaft 502 described later) disposed on the power transmission path between the third rotating element and the other wheel, or the differential mechanism.

The crush stroke during collision of one side of the vehicle thereby increases. For this reason, it becomes possible to further protect the passenger space. In addition, since the rotor is arranged so as to be located lower than the first power transmission member arranged on the power transmission path between the electric motor and the differential mechanism, the electric motor is arranged at a lower position in the vertical direction. For this reason, it becomes possible to make the vehicle lower center of gravity. In addition, it becomes possible to secure the volume (spatial capacity) of the front compartment corresponding to the engine room of the vehicle in which the left wheel and right wheel are driven by an engine rather than an electric motor. In addition, since the rotation axis of the rotor is arranged so as to extend in the vertical direction of the vehicle, the electric motor becomes a configuration in which the radial direction of the rotor of the electric motor matches the horizontal direction. For this reason, it becomes possible to use a larger diameter motor as the electric motor. In addition, it is possible to secure the capacity (spatial volume) of the front compartment without harming the design or drivability of the vehicle.

In this case, it is preferable for the first power transmission member to include: a first rotating body (for example, the bevel gear 304 described later) disposed on a side of the electric motor on the power transmission path; a second rotating body (for example, the differential ring 401 described later) disposed on a side of the differential mechanism on the power transmission path; and a third rotating body (for example, the intermediate shaft 321 described later) interposed between the first rotating body and the second rotating body, in which the third rotating body is disposed so as to extend in the front/rear direction of the vehicle, and at least part of the electric motor is disposed so as to be located to the one side relative to the center in the front/rear direction, in relation to the second power transmission member, the third power transmission member or the differential mechanism.

The third rotating body is thereby arranged so as to extend in the front/rear direction of the vehicle body. For this reason, it becomes a positional relationship in which the electric motor is offset relative to the differential mechanism in a side view. For this reason, the electric motor is arranged closer to the front end of the vehicle. As a result thereof, it is possible to further increase the crash stroke during collision, and thus it becomes possible to further protect the passenger space.

In addition, it is preferable for the second power transmission member or the third power transmission member to be located more to the other side relative to the center in the front/rear direction than an end (for example, the rear end of the electric motor 300 described later) on another side than the one side in relation to the center of the front/rear direction of the electric motor. The electric motor is thereby arranged closer to the front end of the vehicle. As a result thereof, it is possible to further increase the crash stroke during collision at the front of the vehicle, and thus it becomes possible to further protect the passenger space.

In addition, it is preferable for the electric motor to be disposed so that the rotor is located more downwards than the second power transmission member, the third power transmission member or the differential mechanism. The electric motor is thereby arranged at a lower position in the vertical direction. For this reason, it becomes possible to make the vehicle a lower center of gravity. In addition, it becomes possible to secure the volume (spatial capacity) on the upper side of the front compartment corresponding to the engine room of the vehicle in which the left wheel and right wheel are driven by an engine rather than an electric motor.

In addition, it is preferable for at least part of the electric motor to be disposed below the second power transmission member, the third power transmission member or the differential mechanism, so that the second power transmission member, the third power transmission member or the differential mechanism overlaps in a vertical direction view. The space below the second power transmission member, third power transmission member or differential mechanism is effectively used as the space arranging the electric motor. In addition, the electric motor, differential mechanism, second power transmission member and third power transmission member are arranged compactly in the vertical direction of the vehicle. For this reason, the electric motor is arranged at a low position in the vertical direction. It thereby becomes possible to make a lower center of gravity.

In addition, it is preferable for an end on an other side than the one side in relation to the center in the front/rear direction of the left wheel or the right wheel is located more to the other side than an end on an other side than the one side in relation to the center in the front/rear direction of the electric motor. The electric motor is thereby arranged at the front. For this reason, it becomes possible to increase the crash stroke during collision.

Effects of the Invention

According to the present invention, it is possible to provide a vehicle which is capable of achieving lowering of the center of gravity of a vehicle having an electric motor, capable of ensuring large capacity at the upper side of the front compartment, and capable of achieving an increase in crash stroke and protection of the passenger space.

PREFERRED MODE FOR CARRYING OUT THE INVENTION

Hereinafter, the first embodiment of the present invention will be explained in detail while referencing the drawings. It should be noted that, in the explanations of the second and later embodiments, the same reference symbols will be attached for configurations, etc. shared with the first embodiment, and explanations thereof will be omitted.

First Embodiment

Figure 1:
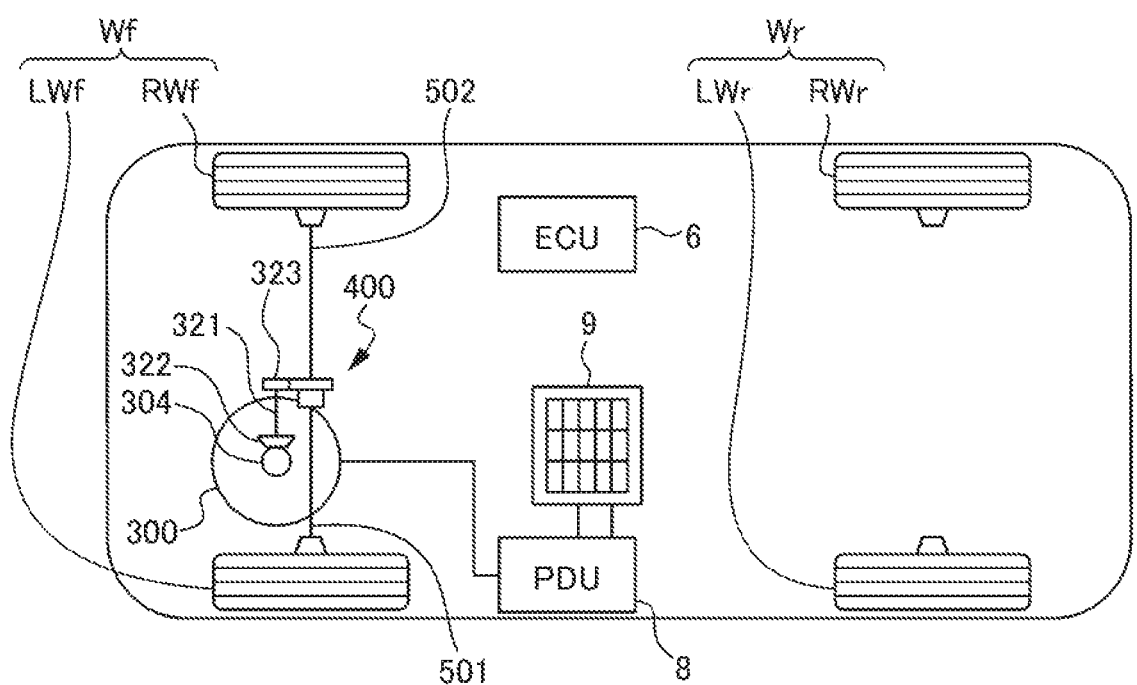
FIG. 1 is an outline plan view showing a vehicle 3 according to a first embodiment of the present invention.
Figure 2:
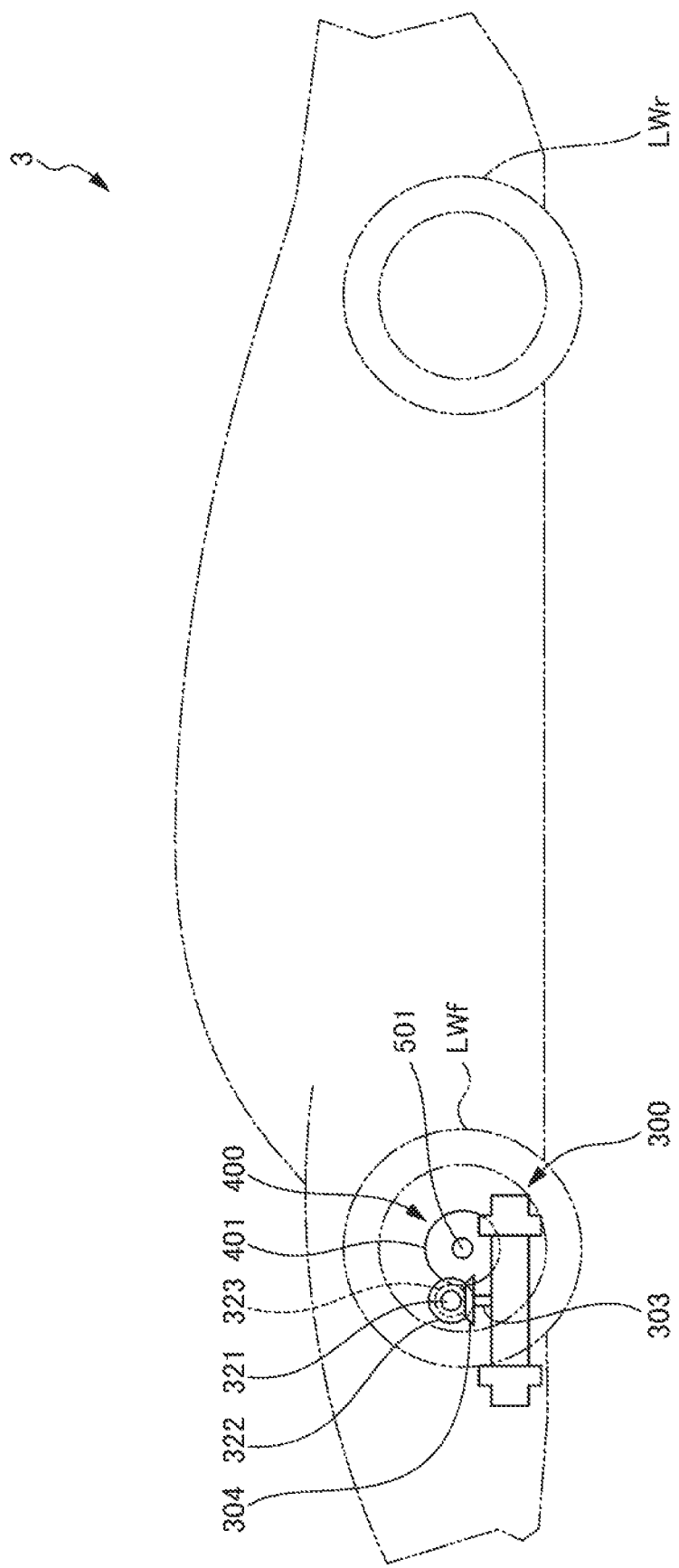
FIG. 2 is an outline side view showing the vehicle 3 according to the first embodiment of the present invention.
Figure 3:
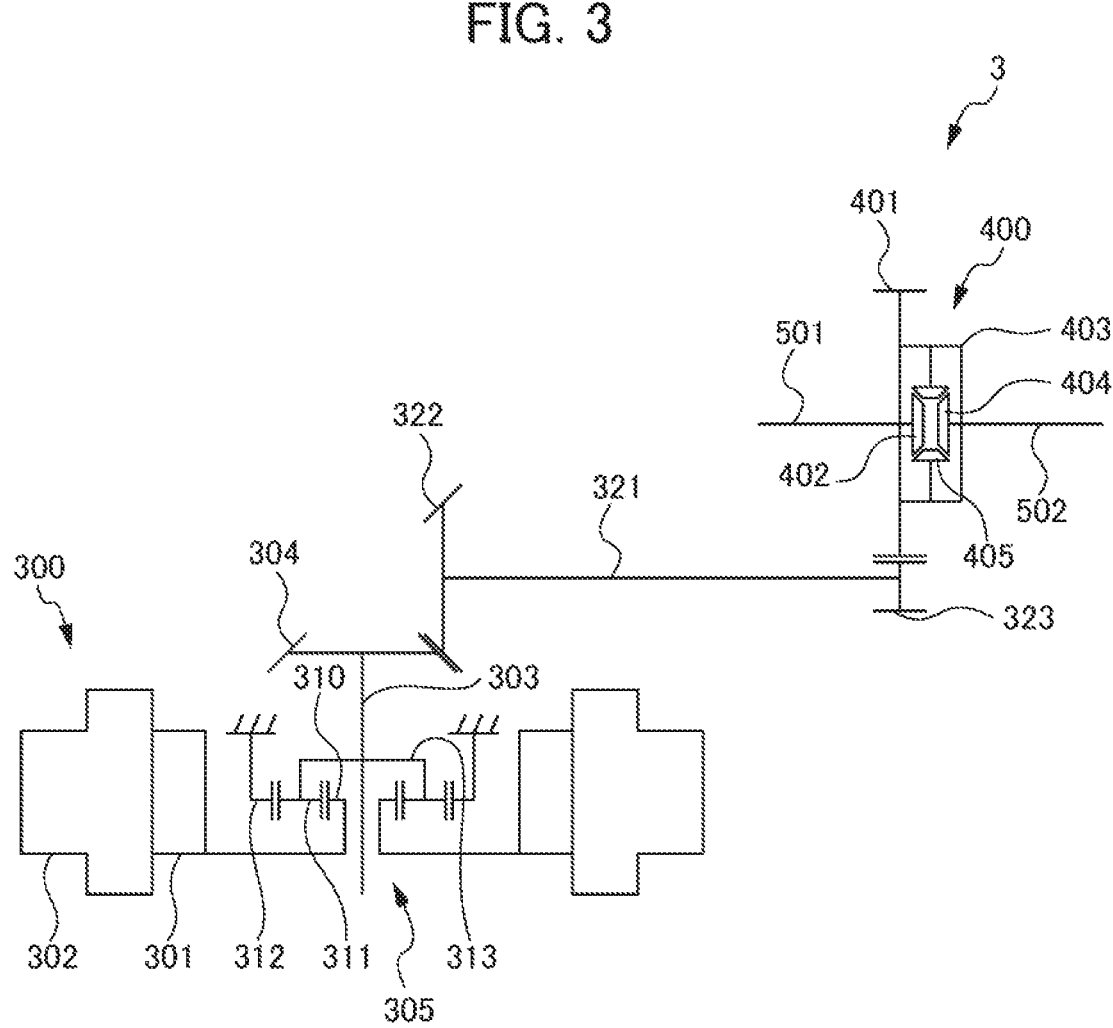
FIG. 3 is a skeleton expansion plan showing the vehicle 3 according to the first embodiment of the present invention.
Figure 4:
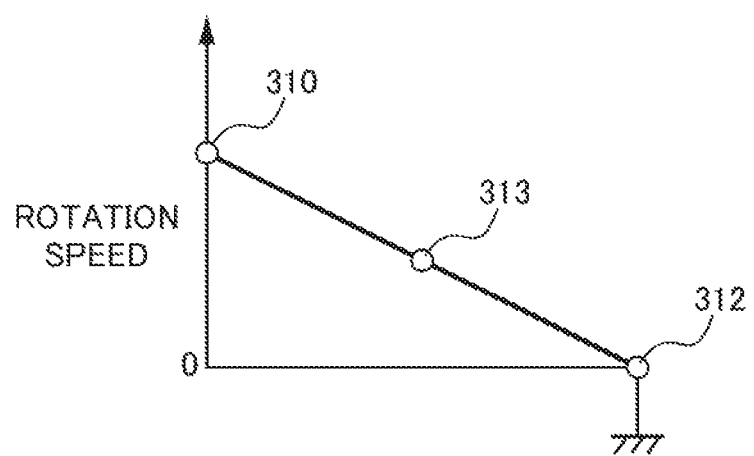
FIG. 4 is a collinear figure showing a relationship between a sun gear 310, carrier 313 and ring gear 312 of a reduction mechanism 305 for an electric motor 300 of the vehicle 3 according to the first embodiment of the present invention.

FIG. 1 is an outline plan view showing a vehicle 3 according to the first embodiment of the present invention. FIG. 2 is an outline side view showing the vehicle 3 according to the first embodiment of the present invention. FIG. 3 is a skeleton expansion plan showing the vehicle 3 according to the first embodiment of the present invention. FIG. 4 is a collinear figure showing a relationship between a sun gear 310, carrier 313 and ring gear 312 of a reduction mechanism 305 of an electric motor 300 of the vehicle 3 according to the first embodiment of the present invention.

In FIGS. 1 and 2, the left side in the drawings is the forward side of the vehicle 3, and the right side in the drawings is the rear side of the vehicle 3.

As shown in FIG. 1, the vehicle 3 according to the present embodiment is an electric vehicle (electric automobile (EV)) which causes left/right front wheels LWf, RWf to drive with the electric motor 300 configured by a motor having a rotor 301 (refer to FIG. 3) and stator 302 as the power source.

The vehicle 3 includes a drive device equipped with the electric motor 300, an electronic control unit (hereinafter referred to as "ECU") 6 serving as a control unit which controls the electric motor 300, a PDU (power drive unit) 8, and a battery 9. The drive device includes the electric motor 300 including an output shaft 303 and bevel gear 304; a differential mechanism 400 including a differential ring 401; an intermediate shaft 321; a left-front drive shaft 501; and a right-front drive shaft 502. The electric motor 300 is provided at the front of the vehicle 3. The electric motor 300 drives the front wheels Wf (RWf, LWf) via the bevel gear 304, intermediate shaft 321, differential mechanism 400, left-front drive shaft 501 and right-front drive shaft 502.

The electric motor 300, for example, is a three-phase AC motor of larger diameter having a U-phase, V-phase and W-phase, and generates torque for running the vehicle 3, by way of electric power stored in the battery 9. The electric motor 300 is connected to the battery 9 via the PDU 8 which includes an inverter. By the driver depressing the accelerator pedal or brake pedal, electric power supplied from the battery 9 to the electric motor 300, and energy regeneration from the electric motor 300 to the battery 9 are controlled by control signals from the ECU 6 being inputted to the PDU 8.

In addition, to each of the front wheels Wf (RWf, LWf) and rear wheels Wr (RWr, LWr), a friction brake (not illustrated) is provided. This friction brake, for example, is configured by a hydraulic disk brake. When the driver depresses the brake pedal, the depression force is amplified and transmitted via hydraulic cylinders, etc. to the brake pads, and by the friction force generating between the brake disk mounted to each drive wheel and the brake pad, braking of each drive wheel is performed.

Next, the configuration of each part of the drive device of the vehicle 3 according to the present embodiment will be explained. As shown in FIGS. 2 and 3, in the electric motor 300, the rotation axis of the rotor 301 and the output shaft 303 of the electric motor 300 arranged at a position matching the rotation axis, are arranged so as to extend in the vertical direction of the vehicle 3. The rotor 301 of the electric motor 300 is connected to the output shaft 303 of the electric motor 300 via the reduction mechanism 305. The output shaft 303 of the electric motor 300 is arranged more to the front side than the shaft center of the differential ring 401. More specifically, the reduction mechanism 305 is configured by a planetary gear mechanism having a sun gear 301, planetary pinion gear 311 (hereinafter referred to as planetary pinion), and ring gear 312, and the sun gear 310 is provided to the rotor 301 of the electric motor 300 to be integrally rotatable in a concentric positional relationship with the rotor 301.

The sun gear 310 engages with the planetary pinion 311, and the planetary pinion 311 engages with the ring gear 312. The ring gear 312 is fixed to a case (not illustrated) which houses the rotor 301 and stator 302. The carrier 313 which rotatably and revolvably supports the planetary pinion 311 is provided to be integrally rotatable with the output shaft 303 of the electric motor 300. The sun gear 310, carrier 313 and ring gear 312 are configured so that the rotation speeds of these satisfy the collinear relationship aligning on a single line in this aligning sequence on the velocity collinear chart (also referred as collinear chart), as shown in FIG. 4. Herein, in the chart showing the relationship of revolution speed (rotation speed) between each rotating element of the planetary gear mechanism, the distance from the horizontal line indicating value 0 until the white circle of the vertical axis in the collinear chart represents the revolution speed of each rotating element. In addition, in the alignment chart, the spacing of each rotating element on the horizontal axis represents the revolution speed ratio between each rotating element in the alignment chart. At an end of the output shaft 303 of the electric motor 300, the bevel gear 304 has a coaxial positional relationship with the output shaft 303 of the electric motor 300, and is provided to integrally rotate with the output shaft 303 of the electric motor 300.

The intermediate shaft 321 is arranged so as to extend along the extending direction of the left-front drive shaft 501, and right-front drive shaft 502. In other words, the intermediate shaft 321 is arranged in a positional relationship extending in the vehicle width direction of the vehicle 3 (left/right direction of vehicle 3; vertical direction in FIG. 1), and at both ends of the intermediate shaft 321, the bevel gear 322 and the helical gear 323 are respectively provided to be integrally rotatable with the intermediate shaft 321 coaxially. The bevel gear 322 at one end of the intermediate shaft 321 engages with the bevel gear 304 of the output shaft 303 of the electric motor 300. The differential ring 401 has a ring gear configured by a helical gear provided to the differential case 403 of the differential mechanism 400. The front of the differential ring 401 engages with the rear of the helical gear 323 of another end of the intermediate shaft 321. The differential ring 401 is thereby mechanically coupled to the electric motor 300. Therefore, the bevel gear 304, intermediate shaft 321 and differential ring 401 transfer the torque of the rotor 301 of the electric motor 300 to the differential mechanism 400. The rotor 301 of the electric motor 300 is arranged so as to be located lower than the bevel gear 304, intermediate shaft 321 and differential ring 401, in the up/down direction (vertical direction), as shown in FIG. 2.

As shown in FIG. 3, the differential mechanism 400 has a left-side gear 402, differential case 403, right-side gear 404 and differential pinion 405, and is arranged on the power transmission path of the electric motor 300, left-front wheel LWf and right-front wheel RWf.

The left-side gear 402 is mechanically connected to the left-front wheel LWf via the left-front drive shaft 501. The right-side gear 404 is mechanically connected to the right-front wheel RWf via the right-front drive shaft 502. The differential case 403 rotatably and revolvably supports the differential pinion 405. The differential pinion 405 engages with the left-side gear 402 and right-side gear 404, respectively. The differential mechanism 400 is configured so that the three revolution speeds (rotating speed) of the left-side gear 402, differential case 403 and right-side gear 404 satisfy the collinear relationship aligning on a single line, in a collinear chart (not shown) in this aligning sequence. It should be noted that FIG. 3 is a skeleton expansion plan from a rear view of the vehicle 3, and differing from FIGS. 1 and 2, FIG. 3 is drawn in a form depicting only the differential mechanism 400. In other words, the bevel gear 304 and left-front drive shaft 501 and right-front drive shaft 402 are actually arranged at substantially the same height.

As shown in FIG. 1, the rear of the electric motor 300 overlaps with the left-front drive shaft 501 and differential mechanism 400 in a vertical direction view (plan view), and is arranged below the left-front drive shaft 501 and differential mechanism 400 as shown in FIG. 2. Then, as shown in FIG. 2, the electric motor 300 is arranged so that the upper end of the electric motor 300, i.e. upper end part of the output shaft 303 of the electric motor 300, is located above the lower end of the differential ring 401 of the differential mechanism 400 in the vehicle width direction view (side view). Furthermore, in the vehicle width direction view, the shaft center of the differential ring 401 is above the upper end of the electric motor 300, and the electric motor is arranged so as to be located below the bevel gear 304, intermediate shaft 321 and the upper end of the differential ring 401. Furthermore, in the vehicle width direction view, the electric motor 300 is arranged so that part of the rotor 301 of the electric motor 300 is located lower than part of the differential mechanism 400, and in more detail, the lower end of the differential ring 401 of the differential mechanism 400 is located lower than the upper end of the rotor 301 (refer to FIG. 3).

In addition, as shown in FIGS. 1 and 2, the electric motor 300 is arranged so that the shaft center of the output shaft 303 of the electric motor 300 matching the rotating shaft line of the rotor 301 (refer to FIG. 3) of the electric motor is located on one side relative to the center in the front/rear direction of the vehicle 3 (forward side in present embodiment) than the left-front drive shaft 401, right-front drive shaft 502 (refer to FIG. 1) and differential mechanism 400. Then, in the front/rear direction of the vehicle 3, the ends of the left/right-front wheels LWf, RWf (rear end of the left/right-front wheels LWf, RWf in the present embodiment) near the center of the vehicle 3 are located closer to the center of the vehicle 3 (rearward side in present embodiment) than the end of the electric motor near the center of the vehicle 3 (rear end of the electric motor 300 in present embodiment). In addition, in the vehicle width direction view, the front end of the differential mechanism 400 is located more to the rearward side than the front end of the electric motor 300, and the rear end of the differential mechanism 400 is located more to the forward side than the rear end of the electric motor 300. In addition, the electric motor 300 is arranged below the left-front drive shaft 501 in a vehicle width direction view. More specifically, the electric motor 300 is arranged so that the rotor 301 is located more downward than the left-front drive shaft 501 and right-front drive shaft 502 in the vehicle width direction view.

According to the present embodiment, the following effects are exerted. In the present embodiment, the left-front wheel LWf and right-front wheel RWf are arranged biased to the forward side as one side relative to the center in the front/rear direction of the vehicle 3. The electric motor 300 is arranged so that the rotation axis of the rotor 301 extends in the vertical direction of the vehicle 3, and is arranged so that the rotor 30 is located lower than the bevel gear 304, intermediate shaft 321 and differential ring 401 arranged on the power transmission path between the electric motor 300 and differential mechanism 400, and further, is arranged so that the rotation axis of the rotor 301 of the electric motor 300 is located more to a forward side serving as one side relative to the center in the front/rear direction of the vehicle 3, than the left-front drive shaft 501 arranged on the power transmission path between the left-side gear 402 and left-front wheel LWf, the right-front drive shaft 502 arranged on the power transmission path between the right-side gear 404 and right-front wheel RWf, and the differential mechanism 400.

The crash stroke during collision of the front of the vehicle 3 thereby increases. For this reason, it becomes possible to protect the passenger space more. In addition, since the rotor 301 is arranged so as to be located lower than the bevel gear 304, intermediate shaft 321 and differential ring 401, the electric motor 300 is arranged at a lower position in the vertical direction. For this reason, it becomes possible to make the vehicle 3 lower center of gravity. In addition, it becomes possible to secure the volume (spatial capacity) on the upper side of the front compartment corresponding to the engine room of the vehicle in which the front wheels are driven by an engine rather than an electric motor. In addition, since the rotation axis of the rotor 301 is arranged so as to extend in the vertical direction of the vehicle 3, the electric motor 300 becomes a configuration in which the radial direction of the rotor 301 of the electric motor 300 matches the horizontal direction. For this reason, it becomes possible to use a larger diameter motor as the electric motor 300. In addition, it is possible to secure the capacity (spatial volume) of the front compartment without harming the design or drivability of the vehicle 3.

In addition, the left-front drive shaft 501 and right-front drive shaft 502 are located more rearwards in the front/rear direction of the vehicle 3 than the rear end part of the electric motor 300. The electric motor 300 is thereby arranged closer to the rear end of the vehicle 3. As a result thereof, it is possible to further increase the crash stroke during collision of the front of the vehicle 3, and thus it becomes possible to further protect the passenger space.

In addition, the electric motor 300 is arranged so that the rotor 301 is located lower than the left-front drive shaft 501, right-front drive shaft 502 and differential mechanism 400. For this reason, the electric motor 300 is arranged at a lower position in the vertical direction. For this reason, it becomes possible to make the vehicle 3 lower center of gravity. In addition, it is possible to secure capacity (spatial volume) on the upper side of the front compartment.

In addition, a part of the electric motor 300 is arranged downwards so as to overlap the left-front drive shaft 501 and differential mechanism 400, in a vertical direction view. The space below the left-front drive shaft 501 and differential mechanism 400 is effectively used as the space arranging the electric motor 300. In addition, the electric motor 300, and the left-front drive shaft 501 and differential mechanism 400 are arranged compactly in the vertical direction of the vehicle 3. For this reason, the electric motor 300 is arranged at a low position in the vertical direction. It thereby becomes possible to make a lower center of gravity.

In addition, in the front/rear direction of the vehicle 3, the ends of the left-front wheel LWf and right-front wheel RWf (rear end of left-front wheel LWf and right-front wheel RWf) near the center of the vehicle 3 are located closer to the center of the vehicle 3 than the end of the electric motor 300 near the center of the vehicle 3 (rear end of electric motor 300). The electric motor 300 is thereby arranged as forward as possible. The crash stroke during collision of the front of the vehicle 3 thereby increases. As a result thereof, it becomes possible to protect the passenger space more.

In addition, the electric motor 300 is arranged so that the rotational axis of the rotor 301 extends in the vertical direction of the vehicle 3; the rotor 301 is arranged so as to be located lower than the bevel gear 304 of the output shaft 303 of the electric motor 300, the intermediate shaft 321 and the differential ring 401 arranged on the power transmission path between the electric motor 300 and differential mechanism 400, and further, at least part of the electric motor 300 is arranged below the left-front drive shaft 501 and differential mechanism 400 arranged on the power transmission path between the left-side gear 402 and left-front wheel LWf in a vertical direction view.

The space below the left-front drive shaft 501 and differential mechanism 400 is thereby effectively used as the space arranging the electric motor 300. In addition, the electric motor 300, differential mechanism 400 and left-front drive shaft 501 is arranged compactly in the vertical direction of the vehicle 3.

For this reason, the electric motor 300 is arranged at a low position in the vertical direction. It thereby becomes possible to make a lower center of gravity.

In addition, the intermediate shaft 321 is arranged so as to extend along the extending direction of the left-front drive shaft 501 and right-front drive shaft 501. The electric motor 300 is arranged below the left-front drive shaft 501 in a vehicle width direction view.

It thereby becomes a positional relationship in which the electric motor 300 is offset in the vehicle width direction relative to the differential mechanism 400 in a front view. For this reason, it becomes possible to effectively use the space at the front of the vehicle 3. In addition, in the front/rear view of the vehicle 3, it becomes possible to compactly arrange the electric motor 300, differential mechanism 400, left-front drive shaft 501, and right-front drive shaft 502.

In addition, the upper end of the electric motor 300 is arranged so as to be located above the lower end of the differential mechanism 400 in the vehicle width direction view. The electric motor 300, differential mechanism 400, left-front drive shaft 501 and right-front drive shaft 502 are thereby arranged more compactly in the vertical direction of the vehicle 3. For this reason, it is possible to secure volume (spatial capacity) on the upper side of the front compartment. In addition, it becomes possible to achieve lowering of the center of gravity of the vehicle 3 having a larger diameter electric motor 300.

In addition, in the vehicle width direction view, the shaft center of the differential ring 401 is arranged so as to be located above the upper end of the electric motor 300, and below the upper end of the bevel gear 304 of the output shaft 303 of the electric motor 300, intermediate shaft 321 and differential ring 401. In the vertical direction of the vehicle 3, the electric motor 300, differential mechanism 400, bevel gear 304, intermediate shaft 321 and differential ring 401 are thereby arranged more compactly. For this reason, it is possible to secure volume (spatial capacity) on the upper side of the front compartment. In addition, it becomes possible to achieve lowering of the center of gravity of the vehicle 3 having a larger diameter electric motor 300.

In addition, in the vehicle width direction view, the electric motor 300 is arranged so that the bevel gear 304, intermediate shaft 321 and differential ring 401 are located between the end of the electric motor 300 on the forward side, which is one side relative to the center in the front/rear direction of the vehicle 3, and the end of the electric motor 300 on the rearward side, which is another side relative to the center in the front/rear direction of the vehicle 3, in the front/rear direction of the vehicle 3. In the front/rear direction of the vehicle 3, the electric motor 300, bevel gear 304, intermediate shaft 321, differential ring 401 and differential mechanism 400 are thereby arranged compactly. For this reason, it is possible to greatly protect the passenger space without harming the design and drivability of the vehicle 3.

Second Embodiment

Figure 5:
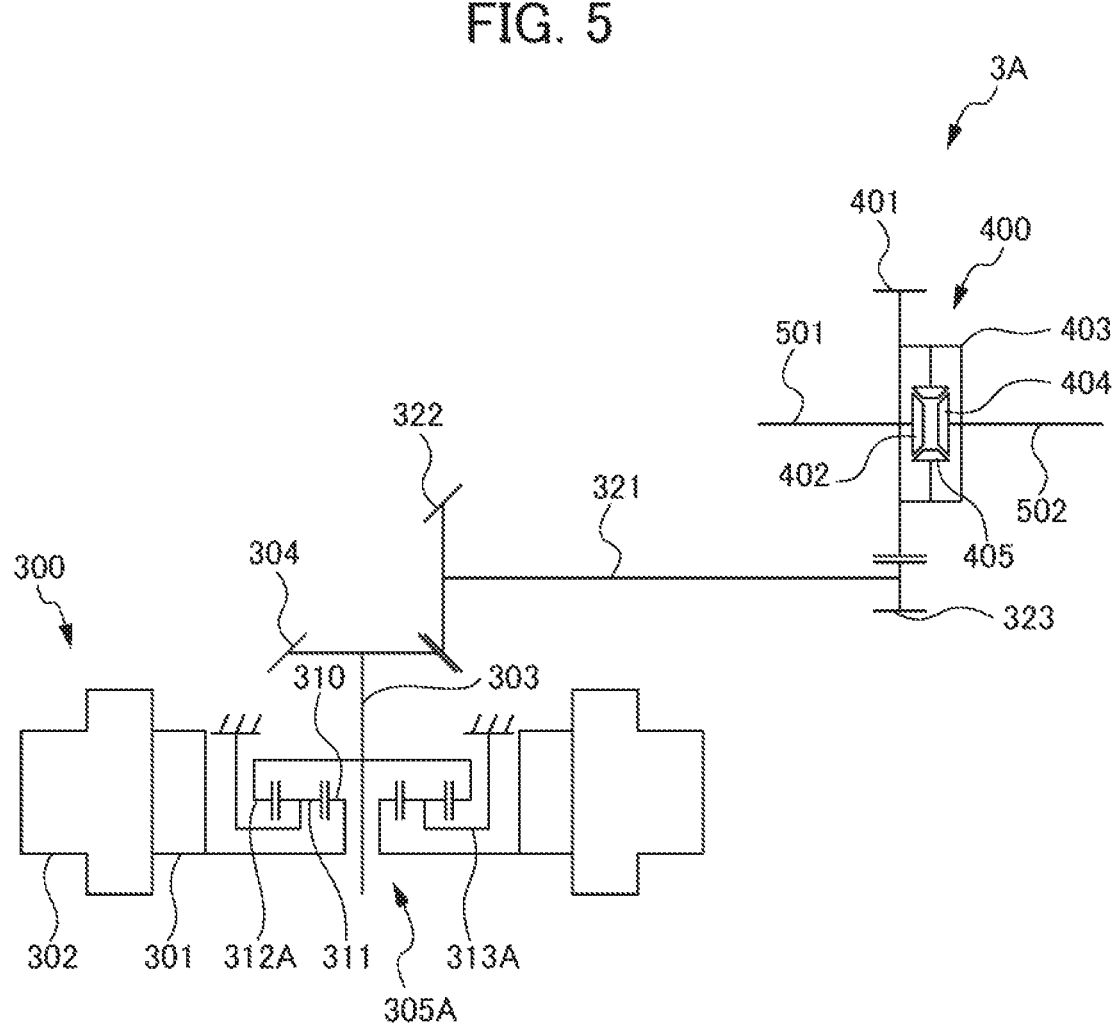
FIG. 5 is a skeleton expansion plan showing a vehicle 3A according to a second embodiment of the present invention.
Figure 6:
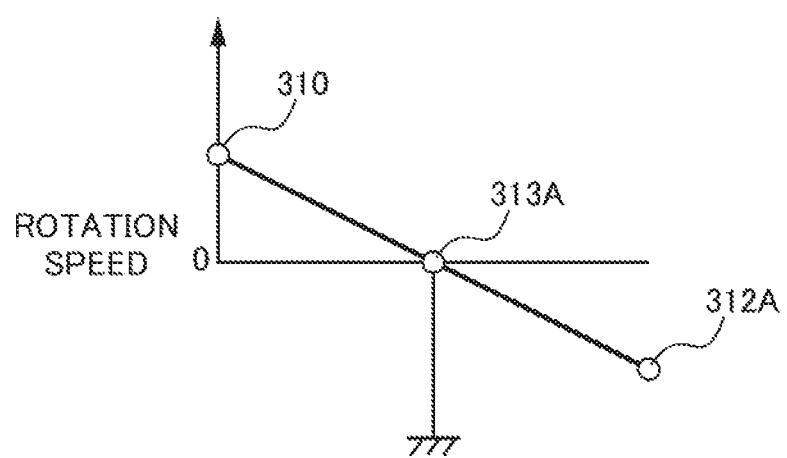
FIG. 6 is a collinear figure showing a relationship between a sun gear 310, carrier 313 and ring gear 312 of a reduction mechanism 305A for an electric motor 300 of the vehicle 3A according to the second embodiment of the present invention.

A vehicle 3A according to a second embodiment of the present invention differs compared to the vehicle 3 according to the first embodiment only in the reduction mechanism 305A from the rotor 301 until output shaft 303 of the electric motor 300. FIG. 5 is a skeleton expansion plan showing a vehicle 3A according to a second embodiment of the present invention. FIG. 6 is a collinear chart showing a relationship between a sun gear 310, carrier 313 and ring gear 312 of a reduction mechanism 305A for an electric motor 300 of the vehicle 3A according to the second embodiment of the present invention. More specifically, the sun gear 310 engages with the planetary pinion 311, and the planetary pinion 311 engages with the ring gear 312A. The carrier 313A which rotatably and revolvably supports the planetary pinion 311 is fixed to the case (not illustrated) housing the rotor 301 and stator 302. The output shaft 303 of the electric motor 300 is provided to be integrally rotatable with the ring gear 312A. The sun gear 310, carrier 313A and ring gear 312A are configured so that the revolution speeds of these satisfy the collinear relationship aligning on a single line in this aligning sequence on the velocity collinear chart (also referred as collinear chart), as shown in FIG. 4.

Third Embodiment

Figure 7:
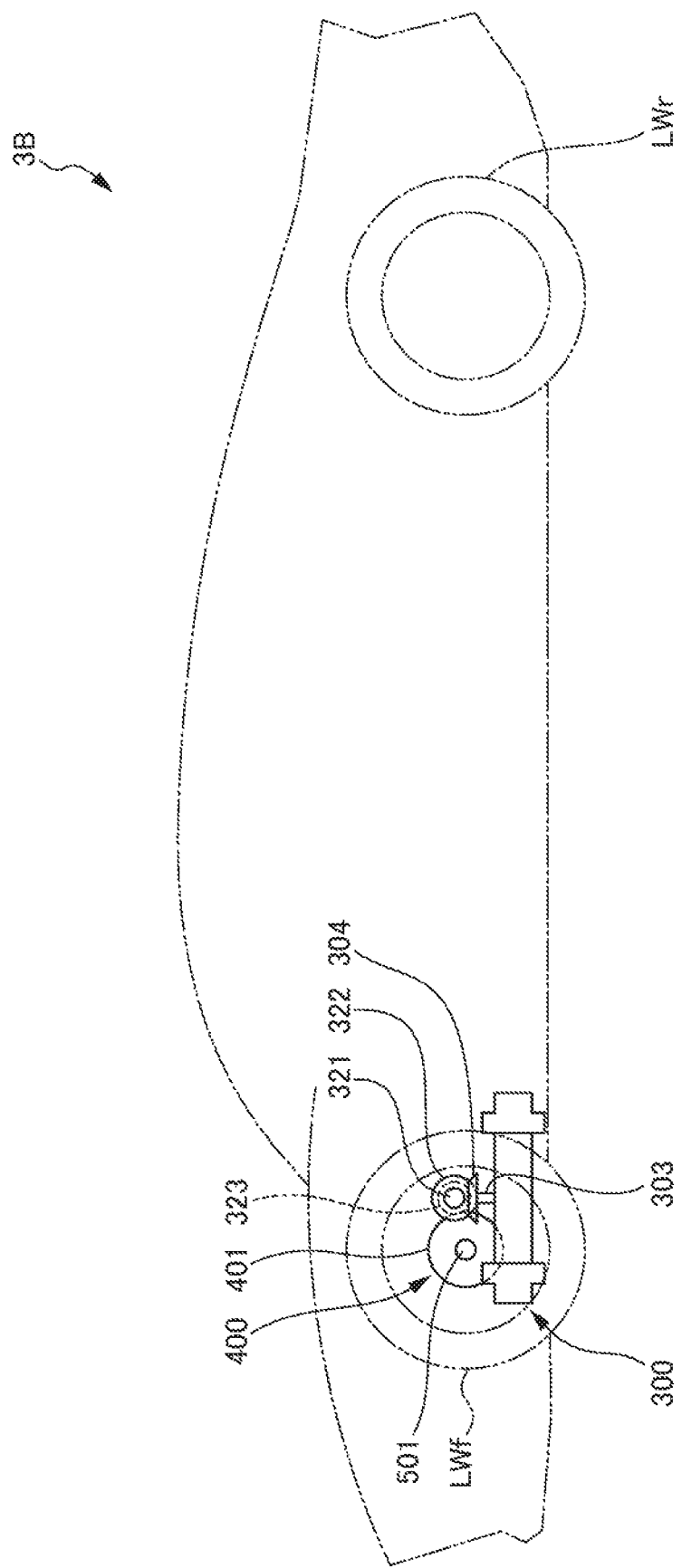
FIG. 7 is an outline side view showing a vehicle 3B according to a third embodiment of the present invention.

A vehicle 3B according to a third embodiment of the present invention differs compared to the vehicle 3 according to the first embodiment, in the position of the electric motor 300 relative to the left-front drive shaft 501 and right-front drive shaft 502. FIG. 7 is an outline side view showing a vehicle 3B according to the third embodiment of the present invention.

More specifically, the electric motor 300 is arranged so that the shaft center of the output shaft 303 of the electric motor 300, which matches the rotation axis of the rotor 301 of the electric motor 300, is located more to the other side (rearward side in present embodiment) relative to the front/rear direction center of the vehicle 3, than the left-front drive shaft 501, right-front drive shaft 502 (refer to FIG. 1), and differential mechanism 400. The rear part of the differential ring 401 engages with the front part of the helical gear 323 on the other end of intermediate shaft 321. For this reason, the intermediate shaft 321 is arranged at the rearward side in the front/rear direction of the vehicle 3B, relative to the left-front drive shaft 501 and right-front drive shaft 502. In addition, the output shaft 303 of the electric motor 300 is arranged more to the rearward side than the shaft center of the differential ring 401.

Fourth Embodiment

Figure 8:
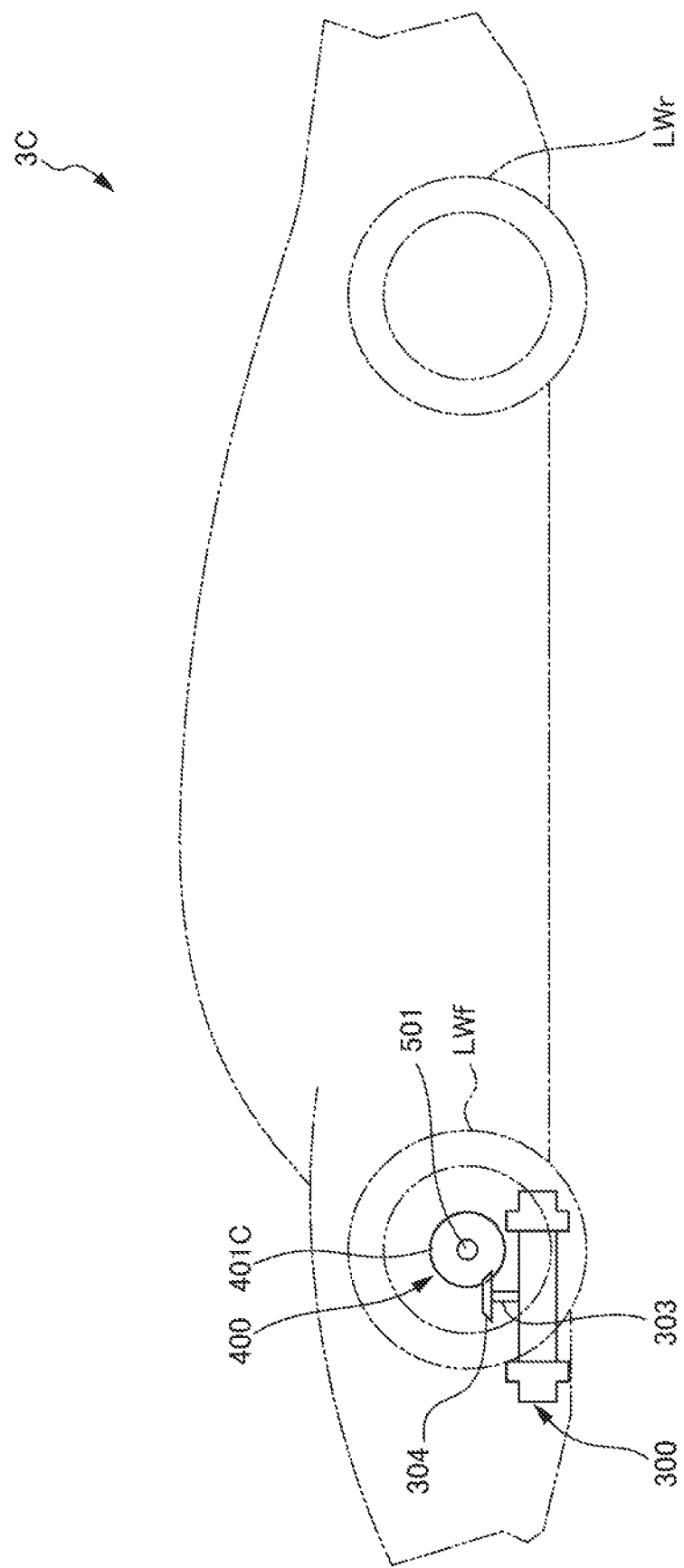
FIG. 8 is an outline side view showing a vehicle 3C according to a fourth embodiment of the present invention.

A vehicle 3C according to a fourth embodiment of the present invention differs compared to the vehicle 3 according to the first embodiment in the point of not having the intermediate shaft 321. In addition, the differential ring 401C differs in the point of being configured by a bevel gear. FIG. 8 is an outline side view showing a vehicle 3C according to the fourth embodiment of the present invention.

Since the vehicle 3C does not have the intermediate shaft 321, it has a configuration in which the rear part of the bevel gear 304 of the output shaft 303 of the electric motor 300 and the front part of the ring gear of the differential ring 401C engage directly. For this reason, the portion on the left side of the rear part of the electric motor 300 overlaps with the left-front drive shaft 501 in the vertical direction view (plan view), and is arranged below the left-front drive shaft 501. In addition, the portion on the right side at the rear part of the electric motor 300 overlaps with the right-front drive shaft 502 in a vertical direction view (plan view), and is arranged below the right-front drive shaft 502. In addition, the portion at the center of the rear part of the electric motor 300 overlaps with the differential mechanism 400 in the vertical direction view (plan view), and is arranged below the differential mechanism 400. According to the above-mentioned configuration, since the intermediate shaft 321 becomes unnecessary, the constituent elements for the transmission of motive power from the electric motor 300 until the differential mechanism 400 decrease, whereby it becomes possible to achieve size reduction, weight reduction and cost savings of the vehicle 3C. In addition, since the locations at which gears engage decrease, it becomes possible to improve the transmission efficiency of torque from the electric motor 300 (decrease torque loss).

Fifth Embodiment

Figure 9:
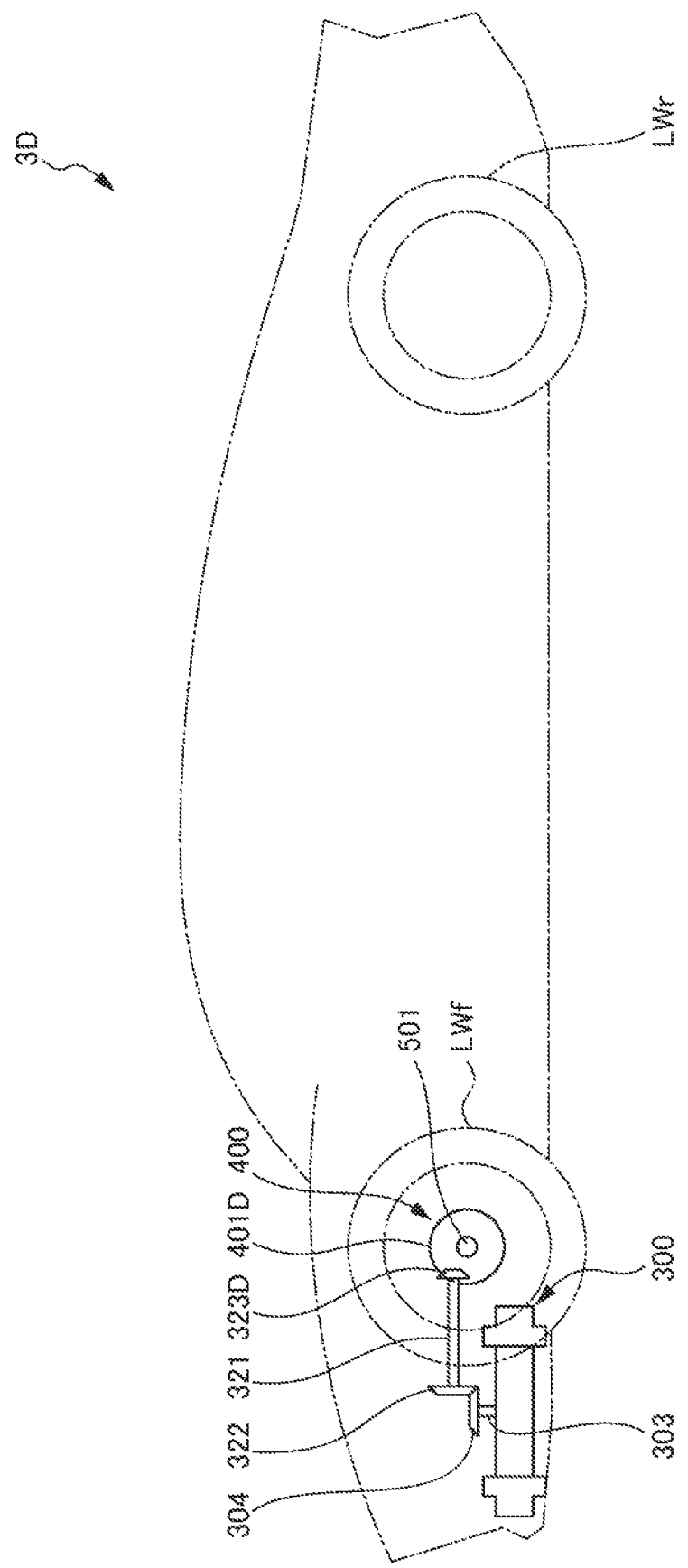
FIG. 9 is an outline side view showing a vehicle 3D according to a fifth embodiment of the present invention.
Figure 10:
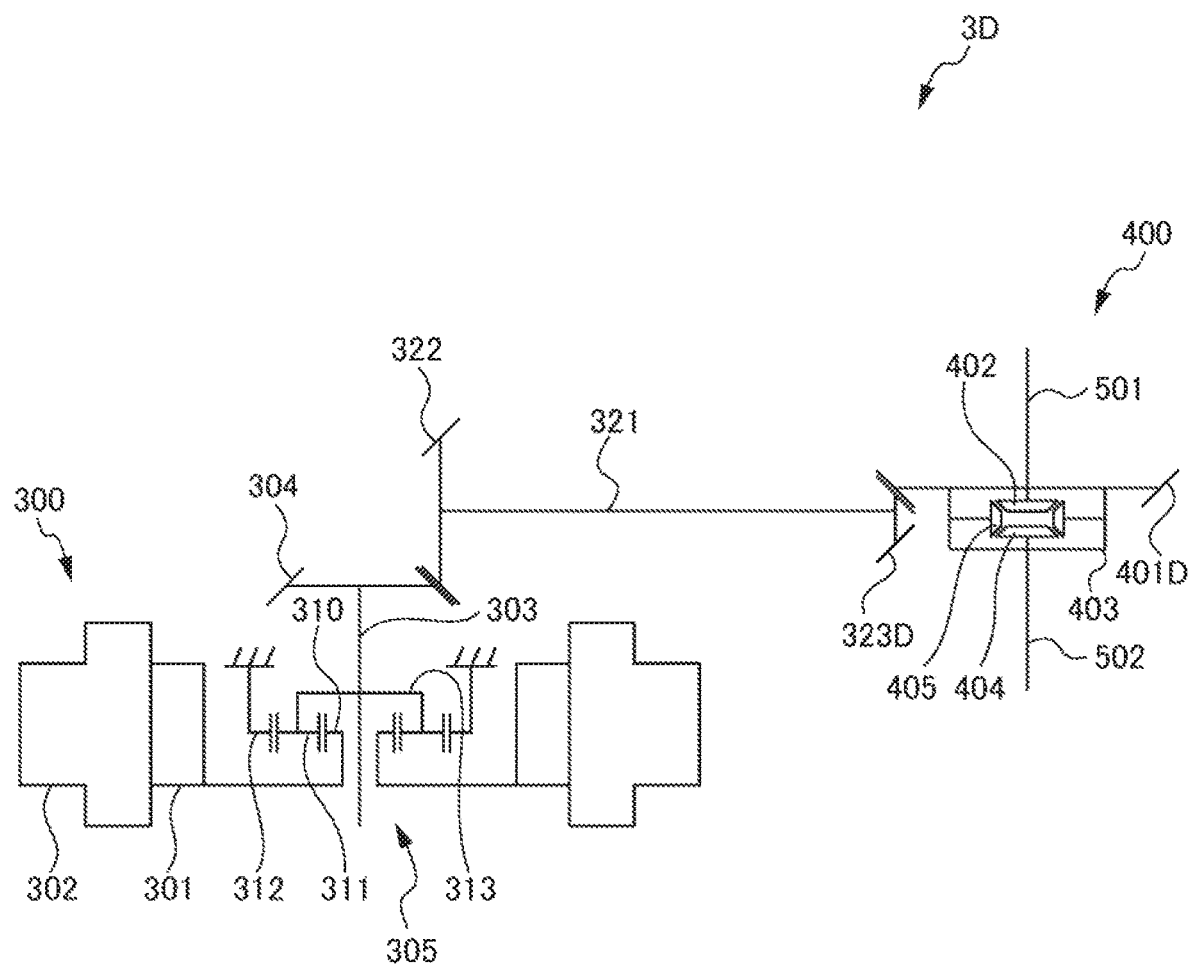
FIG. 10 is a skeleton expansion plan showing a vehicle 3D according to a fifth embodiment of the present invention.

A vehicle 3D according to a fifth embodiment of the present invention, compared to the vehicle 3 according to the first embodiment, differs in the extending direction of the intermediate shaft 321. In addition, a differential ring 401D differs in the point of being configured by a bevel gear, and the point of a bevel gear 323D which engages with the differential ring 401D being used in place of the helical gear 323. FIG. 9 is an outline side view showing the vehicle 3D according to the fifth embodiment of the present invention. FIG. 10 is a skeleton expansion plan showing the vehicle 3D according to a fifth embodiment of the present invention.

It should be noted that, in FIG. 10, for convenience of explanation, the differential mechanism 400 is illustrated to be expanded so as to make the left-front drive shaft 501 and right-front drive shaft 502 connected by the differential mechanism 400 become a positional relationship in which the longitudinal direction of these points in the vertical direction of FIG. 10. In practice, the left-front drive shaft 501 and right-front drive shaft 502 extend in a direction linking the nearby side (surface side) and back side (reverse side) of the paper plane of FIG. 10. It should be noted that FIG. 10 is a skeleton expansion plan according the vehicle-width direction view of vehicle 3, but differs from FIGS. 1 and 2 so that the left-front drive shaft 501 and right-front drive shaft 502 appear in FIG. 10, and depicts in a form expanding only the differential mechanism 400.

More specifically, the intermediate shaft 321 is arranged so as to extend along the front/rear direction of the vehicle 3D. For this reason, the entirety of the electric motor 300 is arranged so as to be located more to the front side, which is one side relative to the center in the front/rear direction of the vehicle 3D, than the left-front drive shaft 501 and right-front drive shaft 502. In addition, the electric motor 300 is arranged so that the left-front drive shaft 501 and right-front drive shaft 502 are located more to the rear side of the vehicle 3 than the end of the electric motor 300 at the rearward side of the vehicle 3.

According to the present embodiment, the following effects are exerted. In the present embodiment, the intermediate shaft 321 is arranged so as to extend along the front/rear direction of the vehicle 3D.

The intermediate shaft 321 is thereby arranged so as to extend in the front/rear direction of the vehicle body. For this reason, it becomes a positional relationship in which the electric motor 300 is offset relative to the differential mechanism 400 in a side view. For this reason, the electric motor 300 is arranged closer to the front end of the vehicle 3D. As a result thereof, it is possible to further increase the crash stroke during collusion of the front part of the vehicle 3D, and thus becomes possible to further protect the passenger space.

In addition, the electric motor 300 is arranged so that the left-front drive shaft 501 and right-front drive shaft 502 are located more to the rearward side of the vehicle 3 than the end of the electric motor 300 at the rearward side of the vehicle 3. The electric vehicle 300 is thereby arranged closer to the front end of the vehicle 3D. As a result thereof, it is possible to further increase the crash stroke during collision of the front part of the vehicle 3D, and thus it becomes possible to further protect the passenger space.

Sixth Embodiment

Figure 11:
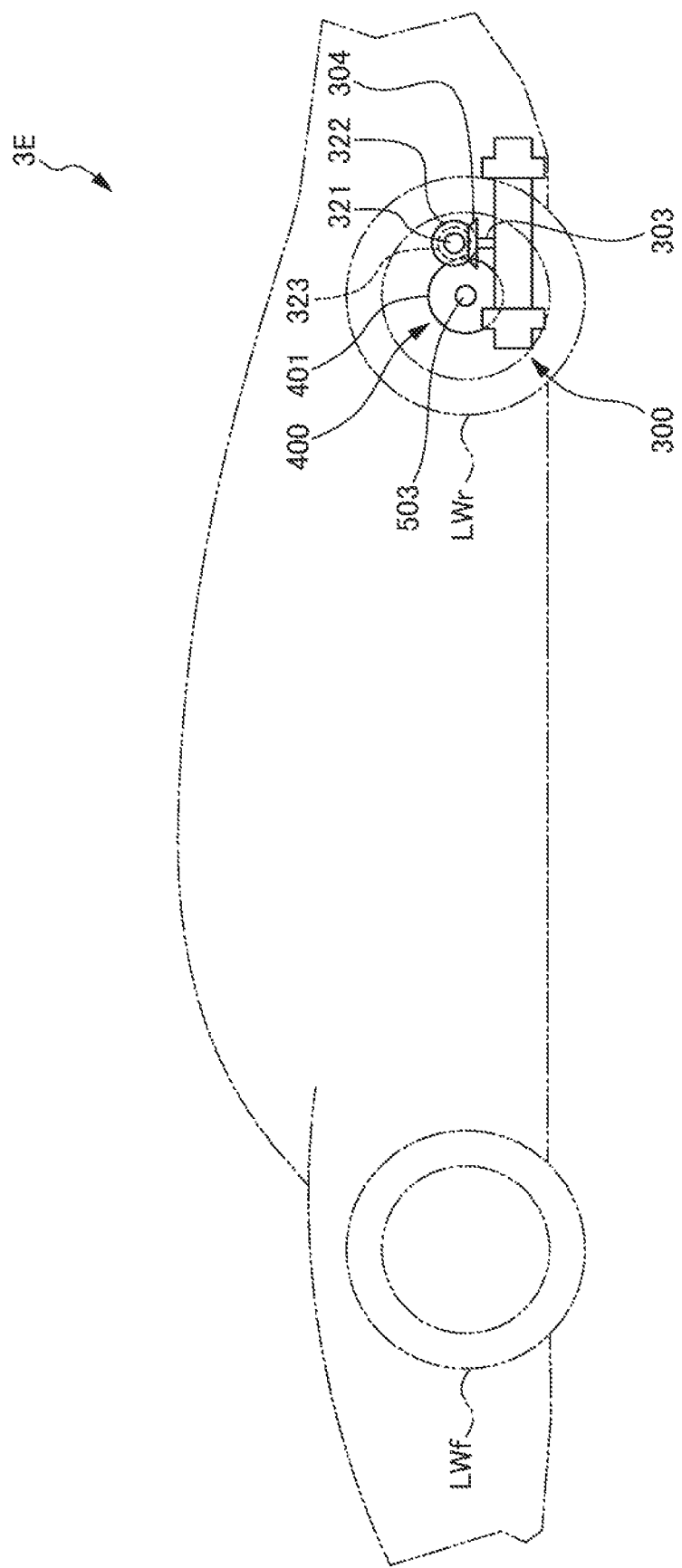
FIG. 11 is an outline side view showing a vehicle 3E according to a sixth embodiment of the present invention.

A vehicle 3E according to a sixth embodiment of the present invention, compared to the vehicle 3 according to the first embodiment, differs in the point of the electric motor 300 driving the rear wheels Wr (RWr, LWr), and the point of the one side relative to the center in the front/rear direction of the vehicle 3E indicating the rearward side. FIG. 11 is an outline side view showing the vehicle 3E according to the sixth embodiment of the present invention.

More specifically, in the differential mechanism 400, the left-side gear 402 (refer to FIG. 3, etc.) is mechanically connected to the left-rear wheel LWr via a left-rear drive shaft 503. The right-side gear 404 (refer to FIG. 3, etc.) is mechanically connected to the right-rear wheel RWr (refer to FIG. 1, etc.) via a right-rear drive shaft (not illustrated). In addition, the rear part of the differential ring 401 engages with the front part of the helical gear 323 on the other end of the intermediate shaft 321. For this reason, the intermediate shaft 321 is arranged more to the forward side (center side) in the front/rear direction of the vehicle 3E than the left-rear drive shaft 503 and right-rear drive shaft (not illustrated).

The electric motor 300 is thereby arranged closer to the rear end of the vehicle 3E. For this reason, it is possible to further increase the crash stroke during collision of the rear part of the vehicle 3E, and thus it becomes possible to further protect the passenger space.

Seventh Embodiment

Figure 12:
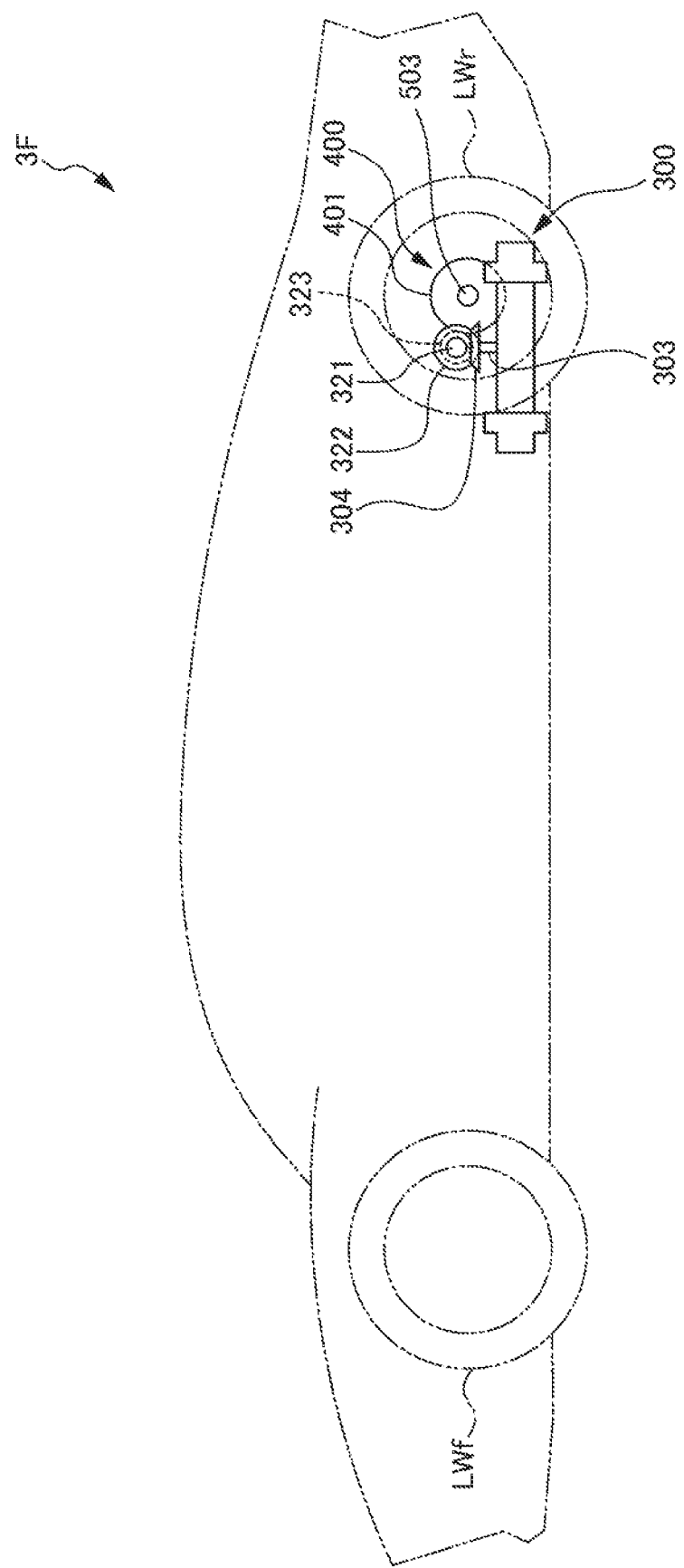
FIG. 12 is an outline side view showing a vehicle 3F according to a seventh embodiment of the present invention.

A vehicle 3F according to a seventh embodiment of the present invention, compared to the vehicle 3E according to the sixth embodiment, differs in the position of the left-rear drive shaft 503 and right-rear drive shaft (not illustrated) relative to the intermediate shaft 321. FIG. 12 is an outline side view showing the vehicle 3F according to the seventh embodiment of the present invention.

More specifically, the front part of the differential ring 401 in the differential mechanism 400 engages with the rear part of the helical gear 323 at the other end of the intermediate shaft 321. For this reason, the intermediate shaft 321 is arranged more to the rearward side in the front/rear direction of the vehicle 3F than the left-rear drive shaft 503 and the right-rear drive shaft (not illustrated).

Eighth Embodiment

Figure 13:
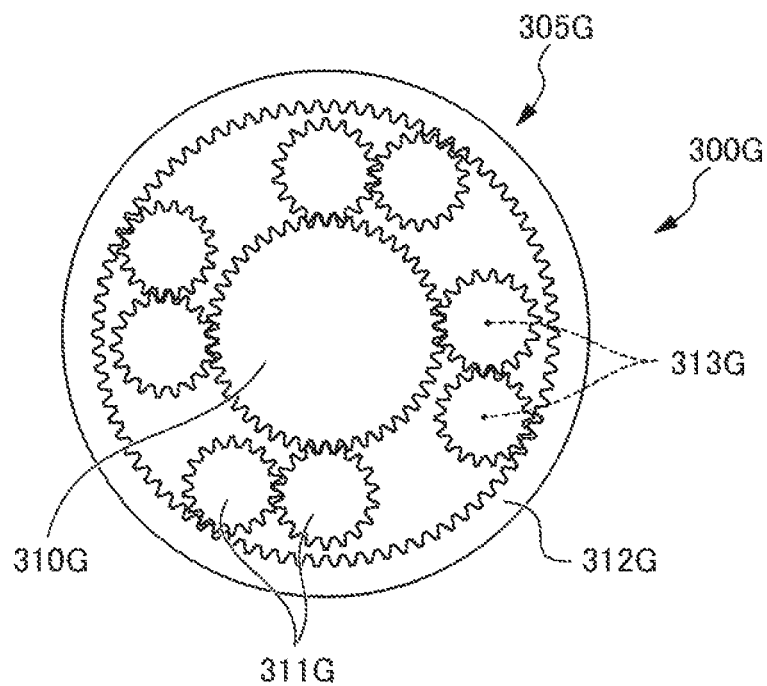
FIG. 13 is an outline plan view showing a reduction mechanism 305G for an electric motor 300G of a vehicle according to an eighth embodiment of the present invention.
Figure 14:
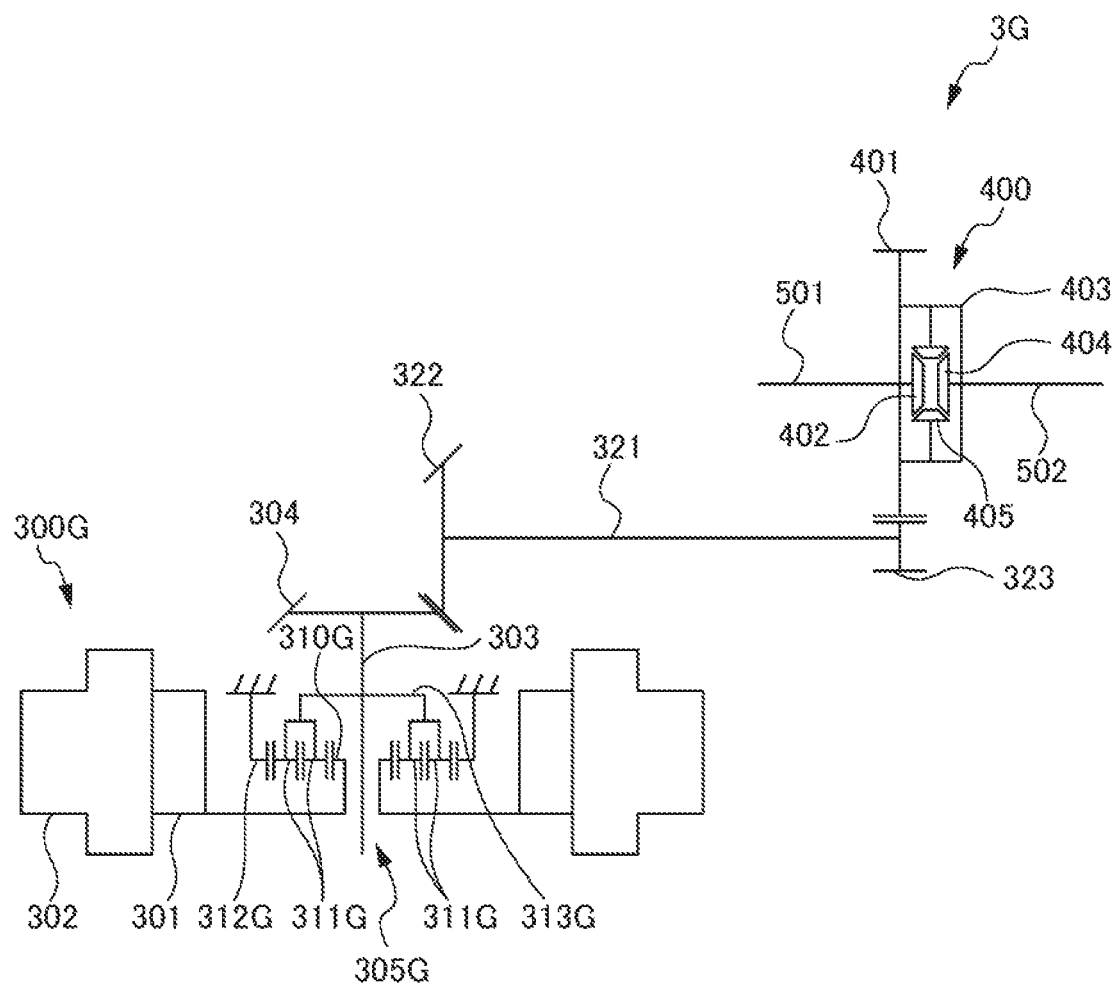
FIG. 14 is a skeleton expansion plan showing a vehicle 3G according to the eighth embodiment of the present invention.
Figure 15:
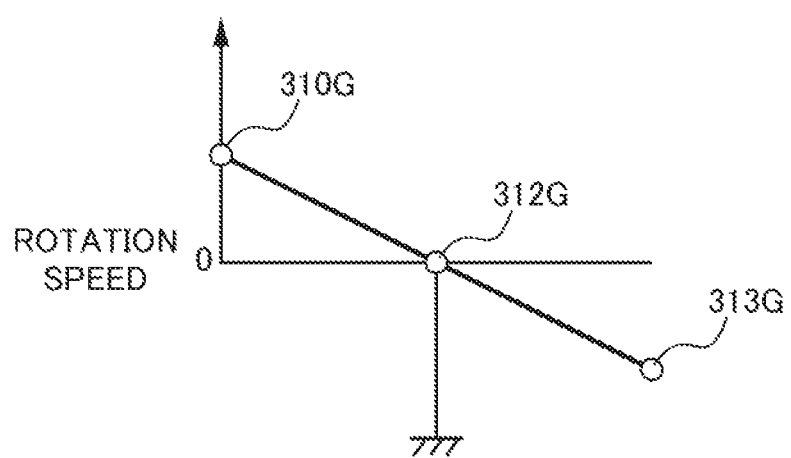
FIG. 15 is a collinear figure showing a relationship between a sun gear 310G, ring gear 312G and carrier 313G for an electric motor 300G of the vehicle according to the eighth embodiment of the present invention.

A vehicle according to an eighth embodiment of the present invention, compared to the vehicle 3 according to the first embodiment, differs in the configuration of the reduction mechanism 305G of an electric motor 300G. FIG. 13 is an outline plan view showing the reduction mechanism 305G of the electric motor 300G of the vehicle according to the eighth embodiment of the present invention. FIG. 14 is a skeleton expansion plan showing a vehicle 3G according to the eighth embodiment of the present invention. FIG. 15 is a collinear chart showing a relationship between a sun gear 310G, ring gear 312G and carrier 313G of the electric motor 300G of the vehicle according to the eighth embodiment of the present invention.

More specifically, the reduction mechanism 305G of the electric motor 300G may be configured by planetary gears of double pinion form, as shown in FIGS. 13 and 14. The ring gear 312G corresponding to the ring gear 312 of the first embodiment thereby is located in the center in the collinear chart as shown in FIG. 15, and the revolution speed ratio is equally divided. In other words, the sun gear 310, carrier 313, and ring gear 312 of the first embodiment correspond to the sun gear 310G, ring gear 312G and carrier 313G of the present embodiment, respectively. The sun gear 310G engages with the one pinion of the planetary pinion (double pinion) 311G, and the other pinion of the planetary pinion 311G engages with the one pinion and the ring gear 312G. The ring gear 312G is fixed to a case (not illustrated) housing the rotor 301 and stator 302. The output shaft 303 of the electric motor 300 is provided to be integrally rotatable with the carrier 313G supporting the planetary pinion 311G to be rotatable and revolvable. The sun gear 310G, ring gear 312G and carrier 313G are configured so that the revolution speeds of these satisfy the collinear chart aligning on a single line in this aligning order, in the velocity collinear chart (also referred as collinear chart).

In this way, the reduction mechanism 305G of the electric motor 300G is configured by planetary gears of double pinion form; therefore, it becomes possible to raise the degrees of freedom in design such as the setting of revolution speed ratio.

It should be noted that the present invention is not limited to the above-mentioned embodiments, and that modifications, improvements, etc. in a scope that can achieve the objects of the present invention are encompassed by the present invention.

For example, the left wheel and right wheel driven by the electric motor are not limited to either the left-front wheel and right-front wheel, or left-rear wheel and right-rear wheel driven in the above-mentioned respective embodiments. More specifically, the present embodiments showed the sixth embodiment illustrated in FIG. 11 in which the electric motor 300 drives the left-rear wheel LWr and right-rear wheel RWr, relative to the first embodiment illustrated in FIG. 2, in which the electric motor 300 drives the left-front wheel LWf and right-front wheel RWf; and showed the seventh embodiment illustrated in FIG. 12 in which the electric motor 300 drives the left-rear wheel LWr and right-rear wheel RWr, relative to the third embodiment illustrated in FIG. 7 in which the electric motor 300 drives the left-front wheel LWf and right-front wheel RWf. In contrast, the fourth embodiment shown in FIG. 8 and the fifth embodiment shown in FIG. 9 describe only configurations in which the electric motor 300 drives the left-front wheel LWf and right-front wheel RWf; however, in this way, it may be configured so that the electric motor 300 drives the left-rear wheel LWr and right-rear wheel RWr instead of a configuration in which the electric motor 300 drives the left-front wheel LWf and right-front wheel RWf. In addition, it may be configured so as to combine the configuration shown in FIG. 2 and the configuration shown in FIG. 11 to drive the four wheels of the left/right-front wheels and the left/right-rear wheels.

In addition, the positional relationship in the front/rear direction of the vehicle 3 between the rotation axis of the rotor 301 of the electric motor 300 and the left-front drive shaft 501, right-front drive shaft 502 or differential mechanism 400 is not limited to the positional relationship of the above-mentioned embodiment. For example, whereas the first embodiment illustrated in FIG. 2 in which the rotational axis of the rotor 301 of the electric motor 300 is located more to one side relative to the front/rear direction center of the vehicle 3 (forward side, which is a side distanced from the front/rear direction center of the vehicle 3), than the left-front drive shaft 501, right-front drive shaft 502 and differential mechanism 400, the third embodiment illustrated in FIG. 7 showed that the rotational axis of the rotor 301 of the electric motor 3 is located more to the other side (rearward side in present embodiment) relative to the front/rear direction center of the vehicle 3 than the left-front drive shaft 501, right-front drive shaft 502 and differential mechanism 400. Similarly, in the fourth embodiment shown in FIG. 8, the electric motor 300 may be arranged so that the rotation axis of the rotor 301 of the electric motor 300 is located on the other side to the center of the front/rear direction of the vehicle 3 (rear side which is side close to the front/rear direction center of the vehicle 3), relative to the left-front drive shaft 501, right-front drive shaft 502 and differential mechanism 400. In addition, at least part of the electric motor 300 may be arranged so as to be located on one side of the front/rear direction center of the vehicle 3, relative to the left-front drive shaft 501, right-front drive shaft 502 and differential mechanism 400.

In addition, at least part of the electric motor 300 may be arranged below the left-front drive shaft 501, right-front drive shaft 502 or differential mechanism 400, so as to overlap the left-front drive shaft 501, right-front drive shaft 502 or differential mechanism 400 in a vertical direction view. In addition, at least part of the electric motor 300 may be arranged below the left-front drive shaft 501 or right-front drive shaft 502 in a vehicle-width direction view.

In addition, the reduction mechanism reducing the speed and transferring the rotation of the rotor 301 to the output shaft 303 in the electric motor 300 is not limited to the reduction mechanisms 305, 305A and 305G in the present embodiment.

In addition, the configurations of each part of the vehicle are not limited to the configurations of each part of the vehicle 3 according to the present embodiment. For example, the differential mechanism 400 has the left-side gear 402, differential case 403, right-side gear 404, and differential pinion 405; however, it is not limited to this configuration. For example, the differential mechanism may be configured by a planetary gear of double pinion type. A ring gear corresponding to the differential case 403 of the first embodiment is located at the center in the collinear figure, and the sun gear or carrier corresponding to the left-side gear 402 or right-side gear 404 is mechanically connected to the left/right front wheels.

In addition, in the first embodiment shown in FIG. 2, although the electric motor 300 is arranged so that the rotation axis of the rotor 301 extends up/down in a substantially vertical direction, the electric motor 300 may be arranged so that the rotation axis extends obliquely up/down so as to intersect the vertical direction.

In addition, the vehicle 3 of the above-mentioned embodiment is an electric vehicle (electric automobile (EV)) which drives the left/right front wheels LWf, RWf or left/right rear wheels LWr, RWr with a motor serving as the electric motor 300 as the source of power; however, it is not limited thereto. For example, the vehicle may be a hybrid vehicle (HEV) having an internal combustion engine such as an engine and an electric motor, in which the electric motor drives the wheels (left/right front wheels, left/right rear wheels); a plug-in hybrid (PHEV) having an internal combustion engine such as an engine and an electric motor, in which the electric motor drives the wheels (left/right front wheels, left/right rear wheels), and is capable of charging a battery via an attachment plug from a power source outside the vehicle; a fuel cell vehicle (FCV) which drives an electric motor using electricity generated by a fuel cell, in which an electric motor drives the wheels (left/right front wheels, left/right rear wheels); or a plug-in fuel cell vehicle (PFCV) which drives an electric motor using electricity generated by a fuel cell and electricity charged to the battery via an attachment plug from a power source outside the vehicle, in which the electric motor drives the wheels (left/right front wheels, left/right rear wheels).

EXPLANATION OF REFERENCE NUMERALS 3, 3A, 3B, 3C, 3D, 3E, 3F vehicle
300, 300G electric motor
301 rotor
302 stator
304 bevel gear
321 intermediate shaft
400 differential mechanism
401 differential ring
402 left-side gear
403 differential case
404 right-side gear
501 left-front drive shaft
502 right-front drive shaft
504 left-rear drive shaft
LWf, Rwf left/right front wheels (left wheel, right wheel, one wheel, other wheel)

The invention claimed is:

1. A vehicle comprising:
an electric motor which drives a left wheel and a right wheel of the vehicle, and has a rotor and a stator; and
a differential mechanism which has three rotating elements, and configured so that rotation speeds of the three rotating elements satisfy a collinear relationship on a single line in a collinear figure,
wherein the differential mechanism is disposed on a power transmission path between the electric motor to which a propeller shaft is not provided, and the left wheel and the right wheel, and torque is transmitted from an upper end of an output shaft of the electric motor to the differential mechanism,
wherein, when defining the three rotating elements as a first rotating element, a second rotating element and a third rotating element in arrangement order of the collinear figure,
the first rotating element is mechanically connected to one wheel, which is either one among the left wheel and the right wheel,
wherein the second rotating element is mechanically connected to the electric motor,
wherein the third rotating element is mechanically connected to the other wheel which is the other one among the left wheel and the right wheel,
wherein the left wheel and the right wheel are disposed biasing to one side relative to a center in a front/rear direction of the vehicle,
wherein the electric motor is disposed so that the rotation axis of the rotor extends along a vertical direction of the vehicle, and is disposed so that the rotor is located lower than a first power transmission member disposed on a power transmission path between the electric motor and the differential mechanism, and
further is arranged so that the rotation axis of the rotor of the electric motor is disposed so as to be located more to the one side relative to the front/rear direction center in relation to:
a second power transmission member disposed on the power transmission path between the first rotating element and the one wheel,
a third power transmission member disposed on the power transmission path between the third rotating element and the other wheel, or
the differential mechanism.

2. The vehicle according to claim 1,
wherein the first power transmission member includes:
a first rotating body disposed on a side of the electric motor on the power transmission path;
a second rotating body disposed on a side of the differential mechanism on the power transmission path; and
a third rotating body interposed between the first rotating body and the second rotating body,
wherein the third rotating body is disposed so as to extend in the front/rear direction of the vehicle, and
wherein at least part of the electric motor is disposed so as to be located to the one side relative to the center in the front/rear direction, in relation to the second power transmission member, the third power transmission member or the differential mechanism.

3. The vehicle according to claim 2, wherein the second power transmission member or the third power transmission member is located more to the other side relative to the center in the front/rear direction than an end on another side than the one side in relation to the center of the front/rear direction of the electric motor.

4. The vehicle according to claim 1, wherein the electric motor is disposed so that the rotor is located more downwards than the second power transmission member, the third power transmission member or the differential mechanism.

5. The vehicle according to claim 4, wherein at least part of the electric motor is disposed below the second power transmission member, the third power transmission member or the differential mechanism, so that the second power transmission member, the third power transmission member or the differential mechanism overlaps in a vertical direction view.

6. The vehicle according to claim 1, wherein an end on an other side than the one side in relation to the center in the front/rear direction of the left wheel or the right wheel is located more to the other side than an end on an other side than the one side in relation to the center in the front/rear direction of the electric motor.

* * * * *